(12) United States Patent
Kataoka et al.

(10) Patent No.: US 7,647,747 B2
(45) Date of Patent: Jan. 19, 2010

(54) HEAT SEALER

(75) Inventors: Yuichiro Kataoka, Osaka (JP); Yasuo Hashimoto, Osaka (JP)

(73) Assignee: Fujiimpulse Co., Ltd., Osaka (JP)

( * ) Notice: Subject to any disclaimer, the term of this patent is extended or adjusted under 35 U.S.C. 154(b) by 245 days.

(21) Appl. No.: 11/563,834

(22) Filed: Nov. 28, 2006

(65) Prior Publication Data

US 2007/0125498 A1 Jun. 7, 2007

(30) Foreign Application Priority Data

Dec. 1, 2005 (JP) ............................. 2005-347666
Sep. 11, 2006 (JP) ............................. 2006-245591

(51) Int. Cl.
*B65B 51/10* (2006.01)

(52) U.S. Cl. ................... 53/374.8; 53/135.2; 53/136.5; 53/386.1

(58) Field of Classification Search ............... 53/373.7, 53/374.8, 374.9, 135.2, 136.1, 136.3, 136.5, 53/381.1, 385.1, 386.1, 415
See application file for complete search history.

(56) References Cited

U.S. PATENT DOCUMENTS

| | | | | |
|---|---|---|---|---|
| 2,672,268 | A * | 3/1954 | Bower | 53/374.8 |
| 3,638,784 | A * | 2/1972 | Bodolay et al. | 206/459.5 |
| 3,706,180 | A * | 12/1972 | Kaneko et al. | 53/386.1 |
| 4,137,958 | A * | 2/1979 | Golby et al. | 53/386.1 |
| 4,561,925 | A * | 12/1985 | Skerjanec et al. | 53/374.8 |
| 5,540,032 | A * | 7/1996 | Sosnik et al. | 53/374.8 |
| 6,047,522 | A * | 4/2000 | Huang | 53/374.9 |
| 6,058,681 | A * | 5/2000 | Recchia, Jr. | 53/373.5 |
| 6,185,908 | B1 * | 2/2001 | Madderom | 53/415 |
| 6,209,290 | B1 * | 4/2001 | Boriani et al. | 53/135.1 |
| 6,506,429 | B1 * | 1/2003 | Recchia, Jr. | 383/117 |
| 6,615,980 | B2 * | 9/2003 | Draghetti et al. | 53/415 |
| 7,207,154 | B2 * | 4/2007 | Araujo | 53/410 |
| 2004/0094949 | A1 | 5/2004 | Savagian et al. | |
| 2005/0037163 | A1 * | 2/2005 | Wu et al. | 428/34.2 |
| 2005/0278991 | A1 * | 12/2005 | Araujo | 40/6 |

FOREIGN PATENT DOCUMENTS

| | | |
|---|---|---|
| JP | 10-311665 | 11/1998 |
| JP | 2001-317862 A | 11/2001 |
| JP | 2006-298466 A | 11/2006 |

OTHER PUBLICATIONS

Chinese Office Action dated Aug. 28, 2009, couterpart of Chinese Patent Application No. 200610160788.8.

* cited by examiner

*Primary Examiner*—Louis K Huynh
(74) *Attorney, Agent, or Firm*—Knobbe Martens Olson & Bear LLP

(57) ABSTRACT

A heat sealer including: a base bar equipped with a heater on a receiving section; and a pressure bonding lever facing the receiving section and capable of pressing and holding a sealing portion of a resin made sealing preform to accommodate contents therein from both sides, and the sealing portion of the resin made sealing preform placed on the receiving section and pressed by the pressure bonding lever to the receiving section side to hold the sealing portion between the receiving section and the pressure bonding lever, and current-heated and weld-sealed, wherein the base bar includes: a recording medium supplier supplying a recording medium from which specific information can be read to a predetermined position; and a recording medium transport machine transporting the recording media having been supplied to the predetermined position one at a time to the sealing portion, whereby the recording medium is sealable integrally with the sealing preform in a single piece.

6 Claims, 6 Drawing Sheets

HEAT SEALER

BACKGROUND OF THE INVENTION

1. Field of the Invention

The invention relates to a heat sealer, and more particularly, to a heat sealer including: a base bar equipped with a heater on a receiving section; and a pressure bonding lever facing the receiving section and capable of pressing and/or holding a sealing portion of a resin made sealing preform to accommodate contents therein from both sides, wherein the sealing portion is placed on the receiving section, the pressure bonding lever is pressed to the receiving section side to hold the sealing portion between the receiving section and the pressure bonding lever, and then the sealing portion is current-heated and weld-sealed.

2. Description of the Related Art

An impulse heat sealer (hereinafter referred to simply as a heat sealer) has been employed in many cases since the heat sealer has advantages such as simplicity and convenience, and certainty in sealing the opening section of a packing bag made of a resin film in which contents are accommodated.

On the other hand, a rule that various information concerning the contents contained in a packing bag are shown on the packing bag is laid down and a method, to meet the rule, has been implemented that a bar code is attached to the packing bag (JAPANESE UNEXAMINED PATENT PUBLICATION No. 10-311665).

In addition thereto, a proposal has been offered that an IC tag is attached to a commodity or a packing bag therefor so as to be obtained more detailed information concerning contained contents instead of a bar code since an information amount is limitedly provided by the bar code (JAPANESE UNEXAMINED PATENT PUBLICATION No. 2001-317862).

The above conventional techniques, however, adopt a method that a worker puts contents into a packing bag and then, seals the bag and thereafter, another worker attaches a bar code or an IC tag to the packing bag, or a method that the same worker conducts a series of manual operations. In any methods, therefore, a problem has arisen that a quality and productivity are determined by a handling ability of the worker or workers, which remains to be improved.

SUMMARY OF THE INVENTION

It is accordingly an object of the invention, in light of the problems of the conventional techniques, to provide a heat sealer capable of sealing a packing bag at almost the same time that a recording medium in which commodity information and the like are recorded is attached to the packing bag.

The heat sealer includes:

a base bar equipped with a heater on a receiving section; and a pressure bonding lever facing the receiving section and capable of pressing and holding a sealing portion of a resin made sealing preform to accommodate contents therein from both sides, and the sealing portion of the resin made sealing preform placed on the receiving section and pressed by the pressure bonding lever to the receiving section side to hold the sealing portion between the receiving section and then the pressure bonding lever, and current-heated and weld-sealed, wherein the base bar includes:

a recording medium supplier supplying a recording medium from which specific information can be read to a predetermined position; and a recording medium transport machine transporting the recording media having been supplied to the predetermined position one at a time to the sealing portion, whereby the recording medium is sealable integrally with the sealing preform in a single piece.

In accordance with the construction, various information is written on a recording medium and then, the recording medium is supplied by the recording medium supplier to thereby, be sealable integrally with a sealing preform in a single piece; therefore, contents accommodated in the sealing preform can be handled at ease, which enable a trouble in a commodity distribution course to be avoided.

As a result, a heat sealer can be provided that is capable of sealing a packing bag at almost the same time that a recording medium in which commodity information and the like are recorded is attached to the bag.

It is preferable that the recording medium transport machine has a suction mouth at a head section on the distal end side so as to enable the recording medium to be suction-raised and transported.

In accordance with the construction, recording media can be surely transported one at a time to a sealing portion of a sealing preform and a recording medium can be sealed integrally with the sealing preform.

It is preferable that the recording medium is an IC tag on which at least sealing conditions, sealing date and time and further, specific information that is writable and non-rewritable are recorded, an IC tag reader is further equipped and information read by the IC tag reader is transferable.

Since, in accordance with the construction, the minimum information as to contents accommodated in a sealing preform is recorded, not only can a not expensive recording medium be used to thereby, reduce a sealing cost, but an IC tag attached to a packing bag could otherwise also be exchanged for another IC tag later, which has led to possibility to so-called undesirable modification of commodity information, whereas in accordance with the construction, information recorded on a recording medium actually cannot be modified after sealing.

An opening mechanism is preferably installed by which an opening end of a sealing preform is mechanically opened.

In accordance with the construction, an operation by a worker to open the opening end of a sealing preform using a hand becomes unnecessary by automation, thereby increasing working efficiency drastically.

DETAILED DESCRIPTION OF THE PREFERRED EMBODIMENTS

Figure 1:
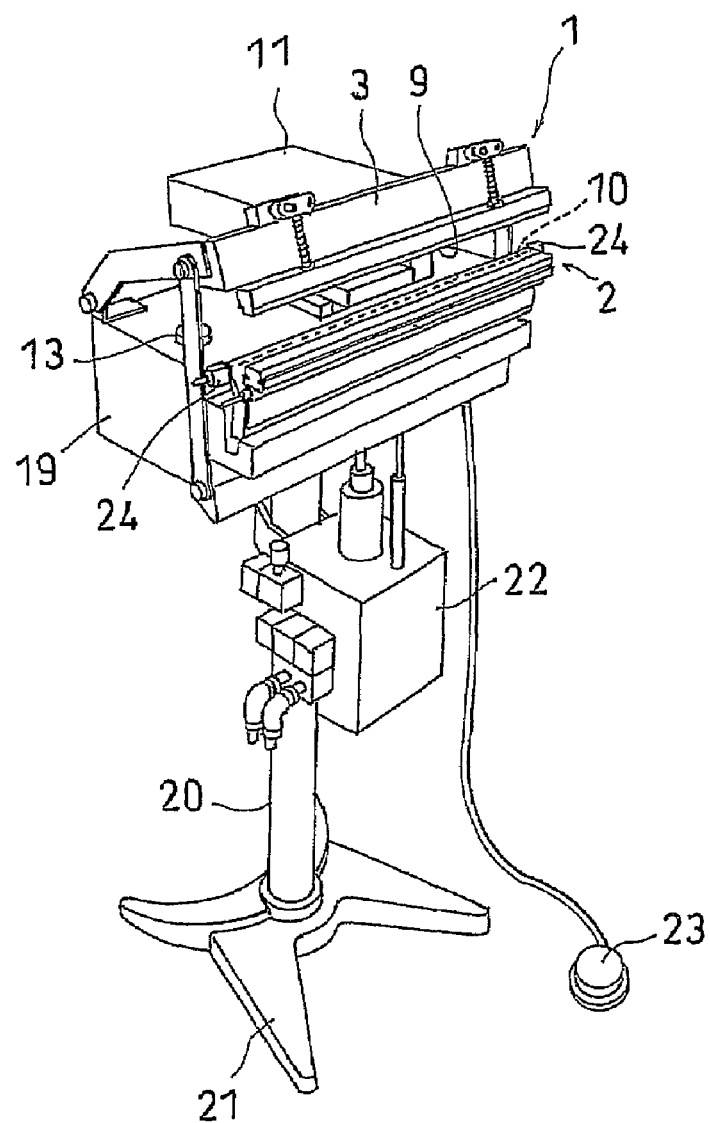
FIG. 1 is a perspective view of a heat sealer related to an embodiment of the invention.
Figure 2:
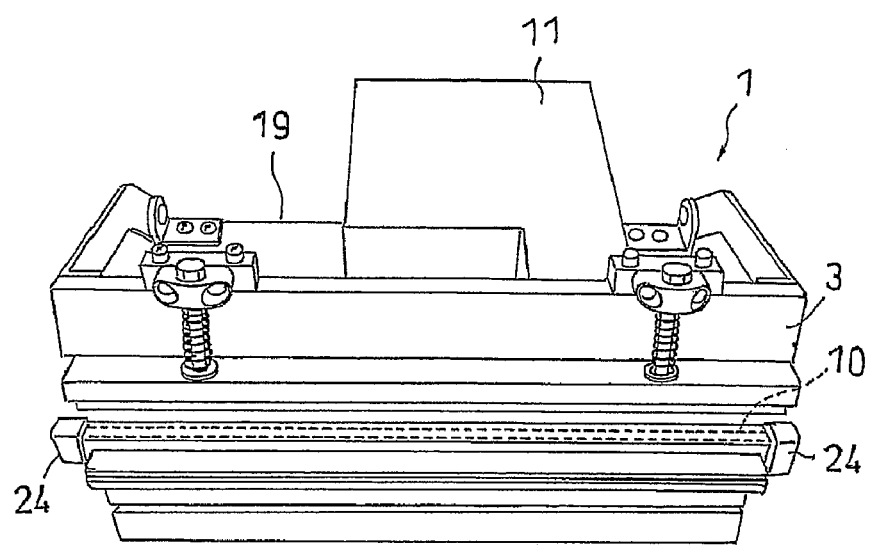
FIG. 2 is a perspective view of the heat sealer of FIG. 1 when viewed from front and above.
Figure 3:
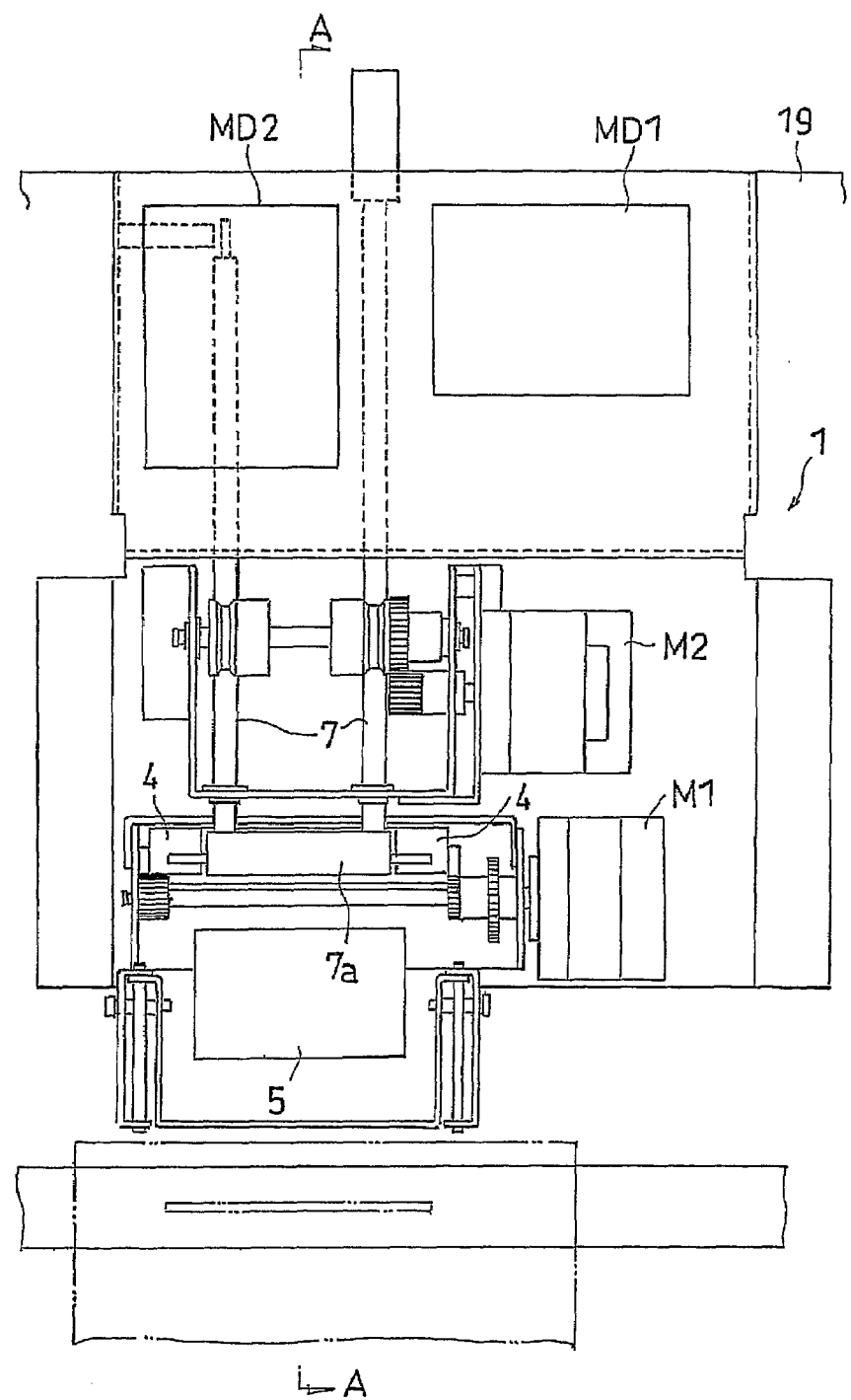
FIG. 3 is a plane view of the heat sealer, wherein a top cover of FIG. 2 is removed.

Detailed description will be given of an embodiment of a heat sealer related to the invention with reference to accompanying drawings. FIG. 1 is a perspective view in a state where a pressure bonding lever 3 of the heat sealer 1 related to the embodiment is released. FIG. 2 is a perspective view of the heat sealer 1 of FIG. 1 when viewed from front and above. FIG. 3 is a plane view of the heat sealer 1, wherein a top cover 11 of FIG. 2 is removed.

The heat sealer 1 includes: a base bar 2 having a linear heater 10 mounted on the top end of a receiving section 12, in a top portion of the heat sealer 1; the pressure bonding lever 3 facing the base bar 2 and capable of pressing and holding an opening mouth, which is a sealing portion, of a resin made packing bag P (corresponding to a sealing preform); and an electric equipment box 19 containing a controller and the like operating electrically of the constituents. The heat sealer 1 further includes thereunder: a support pole 20 supporting the constituents; and a stand 21 supporting the support pole 20 and the like, which makes the heat sealer 1 is installable on a floor surface. To the support pole 20, mounted is a cylinder box 22 driving an IC tag supplier 4, which is a recording medium supplier described later.

Furthermore, a foot switch 23 is equipped that can make power supply switches in process steps turned on by a foot step so that the pressure bonding lever 3 is driven to seal the opening section of a packing bag P. The surface of the linear heater 10 is covered with a Teflon (registered trade mark), a melted piece of the resin made packing bag is hard to be adhered to it and even if the melted piece would adhere it, the piece is easy to be separated. Note that a numeral 24 indicates an electrode connected to the heater.

The opening section of the packing bag P is placed on the receiving section 12 of the base bar 2 and a main power switch 13 is turned on, thereby bringing the whole of the apparatus into an operating state. The foot switch 23 is pressed, thereby not only starting an IC tag supplier described later automatically, but also causing the pressure bonding lever 3 to fall to the base bar section 2 side against a force of a coil spring (not shown), which is a kind of an elastic means. The sealing portion is held between the base bar 2 and the pressure bonding lever 3 and current-heated, and the current supply is ceased when the sealing portion reaches a most preferably set heating temperature by a built-in temperature control mechanism (not shown), whereby the sealing portion is heat-welded for sealing.

It is naturally that a time control method may be employed instead of a temperature control method. That is, the time control method may be operated the following way: a built-in timer mechanism works: a current is supplied and ceased, only for a predetermined time at a temperature set in advance depending on a substance, thickness and the like of a packing bag P, then the sealing portion is cooled after a predetermined time interval is elapsed and thereafter, the pressure bonding lever 3 is released upwardly. A pressure of the pressure bonding lever 3 against the sealing portion is adjusted so as to be adapted to a thickness or the like of the opening section of a packing bag P. The adjustment can be performed using the conventional technique.

The heat sealer 1 related to the embodiment is further equipped with: an IC tag supplier 4, which is a recording medium supplier supplying an IC tag: a kind of a recording medium; and an IC tag reader 5 having a dipole antenna, which is a recording medium reader, wherein an IC tag 4a supplied from the IC tag supplier 4 is sealed in the sealing portion at the almost same time as sealing, which are described later. The IC tag 4a is in the shape of a narrow strip having a width of about 2 mm and a length of about 70 mm and an IC chip with a size of about 1 mm square is adhered in the middle of the strip, which is easy to be handled in shape.

If a recording medium is used that is a writable and non-rewritable specific information read only type as the IC tag 4a, it is convenient since after the IC tag 4a is sealed in a packing bag P, recorded contents are not altered with ease.

In the inner side of the top cover 11, a construction is adopted as shown in FIG. 3 that includes: a driving motor M1 raising upwardly a sheet of the tags 4a which are bundled and accommodated in a tag accommodating case 6 of the IC tag supplier 4; a driving motor M2 driving a head of the IC tag transport machine 7, which is a recording medium transport machine, and which vacuum chucks, holds and transports the raised a single tag to a position of the sealing portion of the packing bag P direct above the heater 10; and driving apparatuses MD1 and MD2 driving the driving motors M1 and M2. Vacuum chucking of a single sheet tag is performed by a vacuum pump mounted so as to be adjacent to the cylinder box 22. The IC tag transport machine 7 has a head section 7a having a suction mouth of a length substantially equal to that of an IC tag 4a at the distal end side thereof and the IC tag 4a is vacuum chucked across almost the whole surface of the length direction thereof to be raised and transported. The IC tag transport machine 7 itself includes two arms (the head section 7a is bridged thereover) able to advance or retreat by the driving motor M2.

The packing bag P is sealed by the heat sealer 1, thereafter, an ID No. of an IC tag is read by the IC tag reader 5 and sealing conditions (a temperature, a pressure, sealing date and time, a sealer No. and the like) are transferable to a recording calculating apparatus such as a personal computer. The transfer method in this case may be implemented either through an interface PS232C which is generally used or with a construction of LAN, in which no specific limitation is imposed on a transfer method. Packing bags P in each of which an IC tag 4a is sealed are accommodated, for example, in arrangement boxes with IC tags 4 thereon prepared contents by contents so as to be ready to use and the arrangement boxes are stored in respective predetermined places on arrangement shelves till a take-out request is issued. If packing bags P are in this way sealed with IC tags by the heat sealer 1, the packing bags P with a IC tag can be effectively used in control of stocked commodities and control of parts. It is natural that an interface can also be installed so as to enable exchange information such as taken-in take-out of commodities in a store house with the outside (a distribution system) through an internet line or the like.

Accordingly, a sealed IC tag 4a is embedded, integrally into single piece, in the opening section of a packing bag P accommodating contents C and it is impossible to exchange the IC tag 4a for another after sealing unless the packing bag P is destroyed: for example, cuts off the opening section.

Description will be given of a method of sealing an IC tag into a packing bag P using an example in which a syringe, which is a medical tool, as an contents C contained in the packing bag P with reference to FIGS. 4 to 8.

Figure 4:
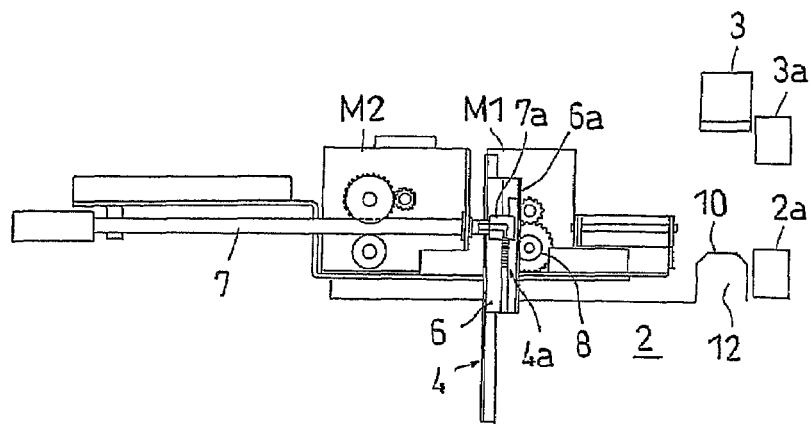
FIG. 4 is a sectional view taken on line A-A of FIG. 3 describing an action of the heat sealer of FIG. 1.

An IC tag accommodation case 6, in which a bundle of IC tags 4a separated individually (for example, 100 sheet) each in the shape of a strip are stacked and accommodated, is installed, as shown in FIG. 4, to the IC tag supplier 4 so as to be movable upwardly or downwardly and rises from the original position by turning on the main power supply 13 and the uppermost IC tag 4a touches the head section 7a of the IC tag transport machine 7. Vertical motions of the IC tag accommodation case 6 is performed by a cooperative operation of a rack provided on the side surface of the IC tag case 6 and a pinion 8 supported by a shaft of the driving motor M1.

Figure 5:
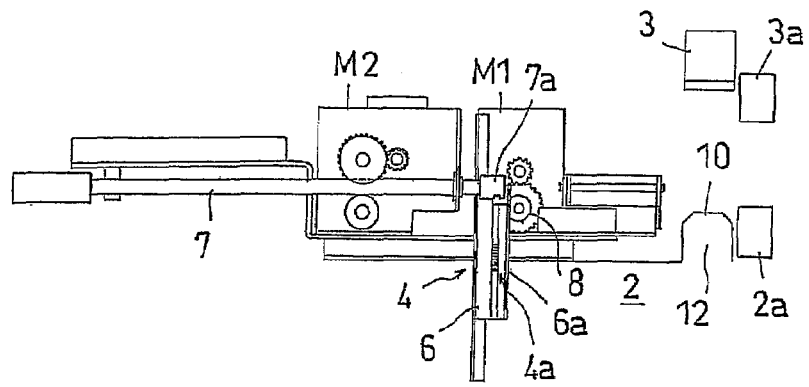
FIG. 5 is a sectional view taken on line A-A of FIG. 3 describing an action of the heat sealer of FIG. 1.

When the foot switch 23 is pressed, the driving apparatus MD1 for a vacuum pump is driven and make a suction to vacuum-chuck of a single sheet of the IC tags 4a to the head section 7a of the tag transport machine. Then, the IC tag accommodation case 6, as shown in FIG. 5, moves downwardly to return to the original position.

Figure 6:
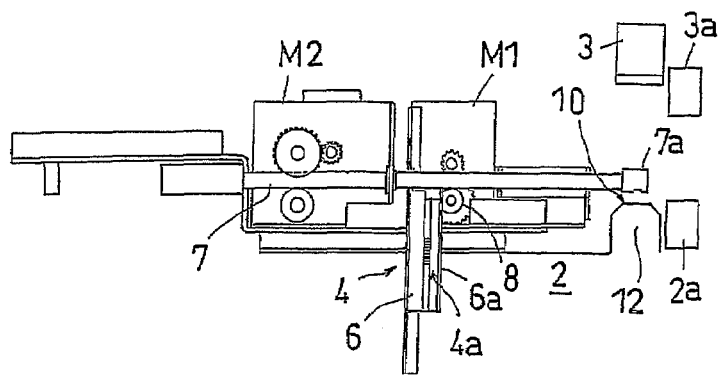
FIG. 6 is a sectional view taken on line A-A of FIG. 3 describing an action of the heat sealer of FIG. 1.

The head section 7a of the IC tag transport machine 7 suction-holding a single sheet of the IC tags 4a, as shown in FIG. 6, advances to direct above of the heater 10.

Figure 7:
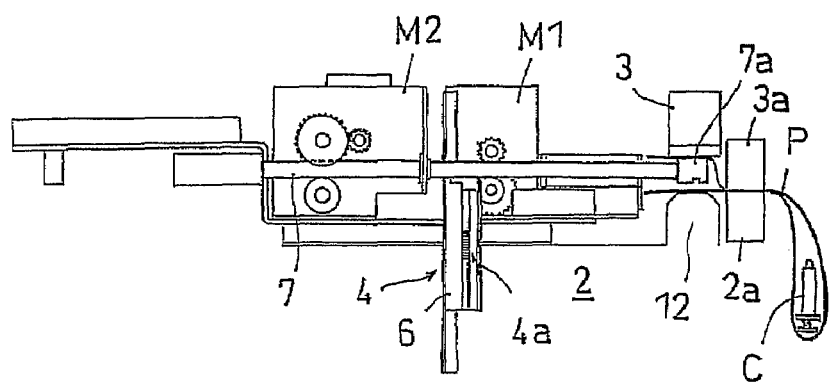
FIG. 7 is a sectional view taken on line A-A of FIG. 3 describing an action of the heat sealer of FIG. 1.

Then, as shown in FIG. 7, not only is the opening end of the packing bag P opened by a hand of a worker, but the opening end of the packing bag P in which a syringe C is accommodated is mounted so as to wrap the head section 7a of the IC tag transport machine, in which state the foot switch 23 is pressed down to hold a portion slightly inward from the opening end of the packing bag P by sandwiching the portion between a film presser 3a attached to the distal end of the pressure bonding lever 3 and the film receiving section 3a of the top end side of the base bar. At this time, the pressure bonding lever 3 moves down to an intermediate position (a position where the lever 3 touches the packing bag P covering the heat section 7a of the IC tag transport machine).

Figure 8:
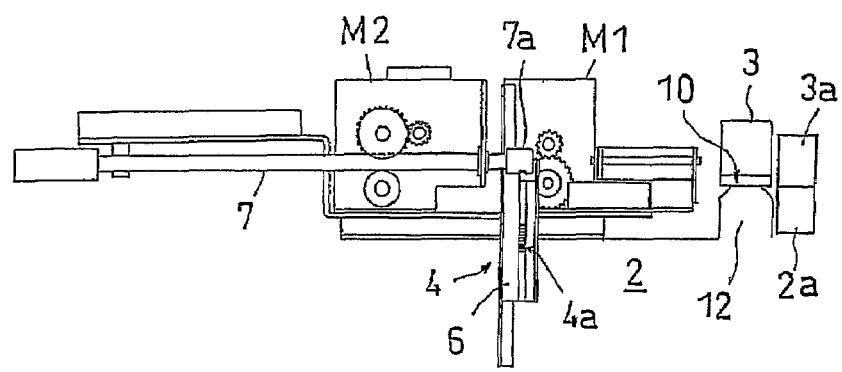
FIG. 8 is a sectional view taken on line A-A of FIG. 3 describing an action of the heat sealer of FIG. 1.

Then, the driving apparatus MD1 for putting the vacuum pump in motion is ceased driving and suction and an IC tag 4a falls and is set at a predetermined position of the packing bag P and, immediately thereafter, the head section 7a of the tag transport machine retreats from inside of the packing bag P. Thereafter, the pressure bonding lever 3, as shown in FIG. 8, touches the installment site of the heater 10 and the opening end of the packing bag P is heat-welded with the IC tag 4a by supplying a current at a predetermined temperature for a predetermined time. After cooling, the pressure bonding lever 3 is released upwardly, thereby completing sealing of the IC tag 4a at the opening end of the packing bag P in which the syringe C is accommodated.

The above operations are repeated till the IC tags accommodated in the IC tag supplier 4. When all the IC tags in the IC tag supplier 4 is heat-welded, the IC tag transport machine 7 retreats and at the same time, the IC tag accommodation case 6 rises from the original position to reach a position where the IC tag accommodation case 6 can be dismounted. The IC tag accommodation case 6 is dismounted from the heat sealer 1, a new bundle of IC tags are accommodated into the IC tag accommodation case 6, the tag IC accommodation case 6 is again mounted to the heat sealer 1 and the power supply is turned on and thereby a sealing process can be repeated. Note that it is preferable to employ a cartridge in which a bundle of IC tags are accommodated instead of the IC tag accommodation case, because of efficiency.

Another Embodiment (1) Another heat sealer related to the embodiment may have a construction in which the heat sealer has a mechanism mechanically opening the opening end of a packing bag P and an IC tag 4a is made stuck to the inner side of the opening end of the packing bag P. That is, the head section 7a of the tag transport machine is inserted into a packing bag P having an opening by the opening mechanism 14 without conducting an operation inserting the head section 7a of a tag transport machine into the inner side of the opening end by a hand of a worker and then the IC tag 4a can be sealed in the packing bag P. The opening mechanism 14 has a structure in which an upper arm 14a and a lower arm 14b can contact the packing bag P so as to sandwich the packing bag P from above and below, wherein the distal ends of the arms 14a and 14b have suction mouths at the for-ends thereof.

Figure 9:
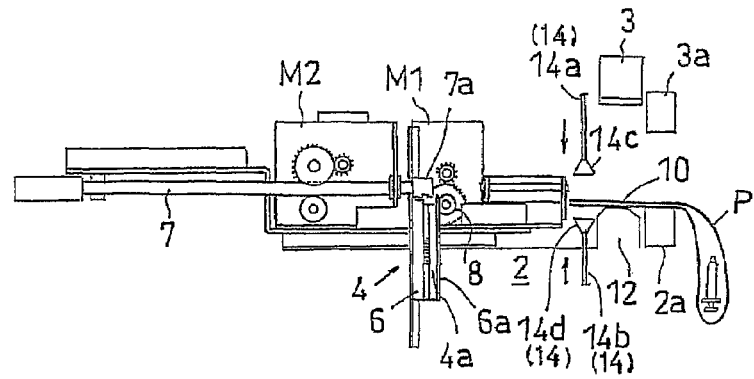
FIG. 9 is a sectional view, similar to FIG. 5, describing an action of a heat sealer of another embodiment.
Figure 10:
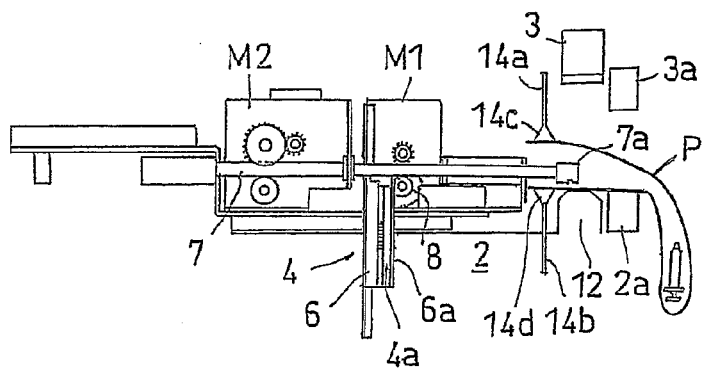
FIG. 10 is a sectional view, similar to FIG. 6, describing an action of the heat sealer of FIG. 9.
Figure 11:
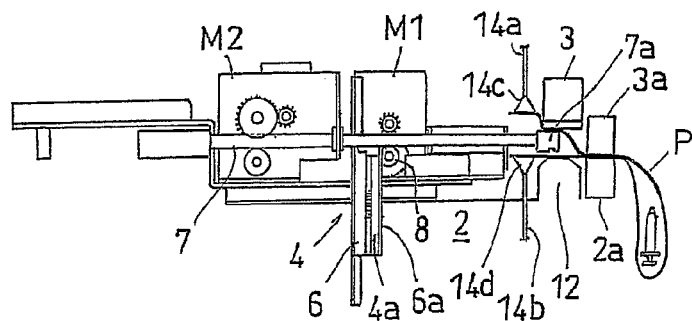
FIG. 11 is a sectional view, similar to FIG. 7, describing an action of the heat sealer of FIG. 9.

Description will be given of actions of the heat sealer with reference to FIGS. 9 to 11. The main switch 13 is turned on, the IC tag accommodation case 6 rises from the original position and the uppermost IC tag 4a touches the head section 7a of the IC tag transport machine 7, which is the same as shown in FIG. 4. Then, when the foot switch 23 is pressed down, the driving apparatus MD1 for putting a vacuum pump in motion is driven and vacuum-chucks one sheet of the IC tags to the head section 7a of the tag transport machine and thereafter, the IC tag accommodation case 6 moves down to return to the original position, which is also the same as shown in FIG. 5. Thereafter, as shown in FIG. 9, the upper and lower arms 14a and 14b of the opening mechanism 14 approach the opening end of the packing bag P, which is positioned in advance. It may naturally be acceptable that the lower arm 14b is stationary and only the upper arm 14a vertically moves.

The upper and lower arms 14a and 14b connected to the vacuum pump touches the opening end of the packing bag P so as to sandwich the opening end thereof, the suction mouths of the fore-ends 14c and 14d thereof vacuum chuck the opening end, and the upper arm 14a is raised or the lower arm is moved down at the same time that the upper arm 14a is raised to thereby open the opening end of the packing bag P. The head section 7a of the IC tag transport machine 7 with vacuum-chucked one IC tag 4a advances into the opening end of the packing bag P. The position of the head section 7a after the advancement, as is in the case of FIG. 6, is direct above the heater 10. In this state, when the foot switch 23 is pressed down, a portion at a position slightly inward from the opening end of the packing bag P, as shown in FIG. 11, is held between the film presser 3a provided on the lower end side of the pressure bonding lever 3 and the film receiving section 2a of the top end of the base bar. Then, the driving apparatus MD1 for putting the vacuum pump in motion is ceased to stop suction and the IC tag 4a falls to a predetermined site of the packing bag P to be set, and immediately thereafter, the head section 7a of the tag transport machine retreats from inside of the packing bag P and the pressure bonding lever 3 touches the installment place of the heater 10, in the state of which the opening end of the packing bag P is heat-welded with the IC tag 4a by supplying a current at a predetermined temperature for a predetermined time, after cooling the pressure bonding lever 3 is released upward, whereby sealing of the IC tag 4a at the opening end of the packing bag P in which a syringe C is accommodated is completed, the sealing operation of which is the same as the case shown in FIGS. 7 and 8

With such a construction, since automation is implemented without necessity of an operation of a worker to open the opening end of the packing bag P with a hand, a working efficiency is greatly improved. Note that a construction is allowed that the upper and lower arms 14a and 14b are not necessarily connected to the vacuum pump and instead, the fore-ends 14c and 14d are simply suction cups. In this case, it is by a hand of a worker that the packing bag P is removed from the upper and lower arms 14a and 14b of the opening mechanism 14.

(2) In the above embodiment, description has been given of an example in which, as the IC tag supplier 4, an IC tag 4a in the shape of a strip is vacuum chucked on the head section 7a at the distal thereof end and transported, while a construction is not limited to the example: vacuum chucking and release of the IC tag 4a may be implemented with a construction that a magnetic substance is embedded at the end portion of a IC tag 4a and an electromagnet installed at the heat section of the IC tag supplier is turned on/off.

(3) While, in the above embodiment, the example has been shown in which the IC tag cartridge 6 in which IC tags 4a in the shape of a strip are accommodated is used as the IC tag supplier, no limitation is specifically imposed to the IC tag cartridge as the IC tag supplier: a construction may be adopted that many IC tags are connected to form a coil and supplied continuously.

(4) No specific limitation is imposed on a construction of a heat sealer and a table top heat sealer, a deaeration type heat sealer and the like may also be used instead of the foot press-down pedal type heat sealer as shown in FIGS. 1 to 3, to which a heat plate type heat sealer may be further employed.

(5) While, in the above embodiment, the example of a heat sealer having a linear heater 10 mounted on the base bar 2 is shown, the linear heater may be, instead, mounted to the pressure bonding lever 3 side and the linear heaters may be mounted on the base bar 2 and the pressure bonding lever 3 respectively.

(6) Articles sealed in a packing bag P are naturally not limited to a medical tool and can include various kinds of articles such as foods, mechanical parts, various kinds of daily needs and others.

What is claimed is:

1. A heat sealer in conjunction with a sealing preform and an Integrated Circuit (IC) tag, comprising:

a single stationary base bar with a single heater on a receiving section; and a pressure bonding lever facing the receiving section and capable of pressing and holding a sealing portion of a resin made sealing preform to accommodate contents therein from both sides, and the sealing portion of the resin made sealing preform placed on the receiving section and pressed by the pressure bonding lever to the receiving section side to hold the sealing portion between the receiving section and the pressure bonding lever, and current-heated and weld-sealed, wherein the base bar comprises:

a recording medium supplier supplying an Integrated Circuit (IC) tag, from which specific information can be read to a predetermined position; and a recording medium transport machine transporting the IC tag having been supplied to the predetermined position one at a time to the sealing portion, whereby the IC tag is sealable integrally with the sealing preform in a single piece.

2. A heat sealer in conjunction with a sealing preform and an Integrated Circuit (IC) tag, comprising:

a base bar with a current activated heater for weld-sealing on a receiving section;

the sealing preform, the sealing preform adapted to accommodate contents therein from both sides, said sealing preform made of resin and comprising a sealing portion placed on the receiving section of the base bar;

a pressure bonding lever facing the receiving section and capable of pressing and holding the sealing portion, and the sealing portion placed on the receiving section in a position that can be pressed by the pressure bonding lever to the receiving section side to hold the sealing portion between the receiving section and the pressure bonding lever, and current-heated and weld-sealed upon activation of the current-activated heater, and the IC tag, on which information comprising at least sealing conditions, sealing date and time are recorded in writable and non-rewritable format, wherein the base bar comprises:

a recording medium supplier supplying the IC tag from which specific information can be read to a predetermined position;

an opening mechanism by which an opening end of the sealing preform is mechanically opened; and a recording medium transport machine adapted to transport the IC tag one at a time from the predetermined position to the sealing portion, such that the IC tag is sealed inside the sealing preform upon pressing by the pressure bonding lever to the receiving section and activation of the current-activated heater.

3. The heat sealer according to claim 2, wherein the recording medium transport machine has a suction mouth at a head section on the distal end side thereof so as to enable the IC tag to be suction-raised and transported.

4. The heat sealer according to claim 2, wherein at least sealing conditions, sealing date and time and further, specific information that is writable and non-rewritable are recorded on the IC tag, and further comprising an IC tag reader, wherein information read by the IC tag reader is transferable.

5. The heat sealer according to claim 2, wherein the recording medium transport machine has a suction mouth at a head section on the distal end side thereof so as to enable the IC tag to be suction-raised and transported, at least sealing conditions, sealing date and time and further, specific information that is writable and non-rewritable are recorded on the IC tag, and comprising an IC tag reader wherein, information read by the IC tag reader is transferable, and further comprising an opening mechanism by which an opening end of the sealing preform is mechanically opened.

6. The heat sealer in conjunction with the sealing preform and the IC tag according to claim 1, further comprising:

a recording medium reader that reads the information recorded on the IC tag, and recording calculating apparatus to which the information read by the recording medium reader is transferred.

* * * * *

UNITED STATES PATENT AND TRADEMARK OFFICE
CERTIFICATE OF CORRECTION

PATENT NO. : 7,647,747 B2
APPLICATION NO. : 11/563834
DATED : January 19, 2010
INVENTOR(S) : Yuichiro Kataoka et al.

It is certified that error appears in the above-identified patent and that said Letters Patent is hereby corrected as shown below:

Column 2 (Item 56), line 13; Under Other Publications, change "couterpart" to --counterpart--.

Column 6, line 57; change "8" to --8.--.

Column 8, line 37; In Claim 4, change "reader ," to --reader,--.

Column 8, line 51; In Claim 6, change "claim 1," to --claim 2,--.

Signed and Sealed this

Twenty-eighth Day of September, 2010

David J. Kappos
*Director of the United States Patent and Trademark Office*